US011435508B2

(12) United States Patent
Banaei et al.

(10) Patent No.: US 11,435,508 B2
(45) Date of Patent: Sep. 6, 2022

(54) FLEXIBLE, ULTRA-THIN, HYBRID ABSORPTIVE-REFLECTIVE THIN-FILM FILTERS AND METHODS OF MAKING THE SAME

(71) Applicant: Everix, Inc., Orlando, FL (US)

(72) Inventors: Esmaeil Banaei, Orlando, FL (US); Justin Boga, Orlando, FL (US); Cristina Marie Bisson, Winter Park, FL (US)

(*) Notice: Subject to any disclaimer, the term of this patent is extended or adjusted under 35 U.S.C. 154(b) by 175 days.

(21) Appl. No.: 16/613,238

(22) PCT Filed: May 16, 2018

(86) PCT No.: PCT/US2018/032872
§ 371 (c)(1),
(2) Date: Nov. 13, 2019

(87) PCT Pub. No.: WO2018/213380
PCT Pub. Date: Nov. 22, 2018

(65) Prior Publication Data
US 2020/0142112 A1    May 7, 2020

Related U.S. Application Data

(60) Provisional application No. 62/537,566, filed on Jul. 27, 2017, provisional application No. 62/507,417, filed on May 17, 2017.

(51) Int. Cl.
*G02B 5/28*    (2006.01)
*G02B 1/14*    (2015.01)
*G02B 5/22*    (2006.01)

(52) U.S. Cl.
CPC .............. *G02B 5/287* (2013.01); *G02B 1/14* (2015.01); *G02B 5/223* (2013.01)

(58) Field of Classification Search
CPC ... G02B 1/14; G02B 5/22; G02B 5/28; G02B 5/223; G02B 5/287; G02B 5/208; G02B 5/20
See application file for complete search history.

(56) References Cited

U.S. PATENT DOCUMENTS 5,238,738 A      8/1993   Miller
2002/0186474 A1  12/2002  Weber et al.
(Continued)

FOREIGN PATENT DOCUMENTS

WO    WO 2017/180828 A1    10/2017

OTHER PUBLICATIONS

International Search Report for International Application No. PCT/US2018/032872, dated Jul. 30, 2018, 2 pgs.

*Primary Examiner* — Balram T Parbadia
(74) *Attorney, Agent, or Firm* — The Brickell IP Group, PLLC; A. Robert Weaver

(57) ABSTRACT

A hybrid optical filter includes a plurality of film layers laminated to one another. This renders the filter flexible enough to be bendable and to implement a combination of at least two different wavelength-dependent optical filtering properties in a single hybrid optical filter. Two or more of the optical filtering properties may be caused by interference-based blocking of different ranges of wavelengths of light. Additionally or alternatively, at least one of the optical filtering properties may be an absorptive blocking of a first range of wavelengths of light and at least another one of the optical filtering properties is an interference-based blocking of a second range of wavelengths of light. The first range of wavelengths and the second range of wavelengths may overlap to provide for customized ranges of blocked wavelengths.

6 Claims, 3 Drawing Sheets

(56) References Cited

U.S. PATENT DOCUMENTS

| | | |
|---|---|---|
| 2004/0025232 A1 | 2/2004 | Hartley et al. |
| 2009/0097117 A1* | 4/2009 | Coleman .............. G02B 5/3033 359/489.19 |
| 2015/0146166 A1 | 5/2015 | Weber et al. |
| 2016/0077361 A1 | 3/2016 | Wold et al. |
| 2017/0097453 A1* | 4/2017 | Ambur ............... G02B 27/0905 |

* cited by examiner

FLEXIBLE, ULTRA-THIN, HYBRID ABSORPTIVE-REFLECTIVE THIN-FILM FILTERS AND METHODS OF MAKING THE SAME

CROSS REFERENCE TO RELATED APPLICATIONS

This application is a U.S. National Phase under 35 U.S.C. § 371 of PCT International Application No. PCT/US2018/032872, filed May 16, 2018, which in turn claims the benefit of priority under 35 U.S.C. § 119 to U.S. Provisional Application No. 62/507,417, filed May 17, 2017, U.S. Provisional Application No. 62/537,566, filed Jul. 27, 2017, the contents of which are incorporated herein by reference in their entirety.

TECHNICAL FIELD

The present application relates to a hybrid optical filter for various optical applications.

BACKGROUND

Interference optical filters are inherently complicated and expensive to produce partly because of the complex layer structure required to obtain high optical density. The ability to fine tune the spectral shape of the filtered light is one the advantages of interference filters. Comparatively, absorptive filters can easily achieve relatively high optical density but lack the ability to finely tune the spectral shape of the filtered light. Absorptive filters also lack the angular shift in spectrum that plagues interference filters. Combining absorptive and interference techniques to create a single optical filter reaps the benefits of both types of filters.

Traditionally, such hybrid absorptive, interference filters are made through vacuum deposition of transparent thin-film optical layers on a substrate of pigmented plastic or glass. Optical thin-film layers form the interference component of the hybrid filter and complement the absorptive element in the substrate to generate broader blocking range, higher blocking optical density or to make certain parts of the filter's transmission curve independent of the angle of incidence.

There are a few drawbacks with this traditional approach though. Pigmented substrate materials typically have to be several millimeters thick in order to provide high optical density and, more importantly, be practical for the vacuum coating process. In addition, vacuum coating process has proven to have insufficient scalability at low cost to provide economic solutions for rapidly growing consumer applications of such high-performance hybrid filters. Also, traditional vacuum coated hybrid filters are limited to flat geometry whereas several areas of technology can benefit from flexible or curved filters. For example, LED light sources used in display and illumination applications always demonstrate some angular divergence. When a flat filter is placed on or in front of these light sources, various parts of the emitted light experience various shifted spectra of the filter, limiting Cone-Half Angle (CHA) of the system. A flexible or curved filter can compensate this effect by a curvature that makes the filter surfaces perpendicular to the light source's wave front across a wider angular range.

US patent publication US 2014/0242329 A1 describes a method of producing thin-film optical filters using thermal drawing of structured preform blocks. This method allows for production of thin film interference optical filters in the form of all-plastic flexible ultra-thin films and sheets. This method addresses two major drawbacks of the traditional vacuum coated thin film filters by providing significantly higher scalability and also providing ultra-thin filters that can bend and conform to curved surfaces for the technical advantages mentioned above.

However, the small refractive index contrast between sub-layers of an all-plastic filter limits the achievable optical density across wide spectral ranges. Often thousands of layers would be required to block a few hundred nanometers across the visible light spectrum at optical densities higher than 3. Including such large numbers of layers in preform blocks and filters is practically difficult and expensive. In addition, thermally drawn filters with thousands of sub-layers are usually too thick to offer sufficient flexibility for the advantages mentioned above.

SUMMARY OF THE INVENTION

According to one aspect of the present invention, a hybrid optical filter includes a plurality of film layers laminated to one another. This renders the filter flexible enough to be bendable and to implement a combination of at least two different wavelength-dependent optical filtering properties in a single hybrid optical filter.

For example, two or more of the optical filtering properties may be caused by interference-based blocking of different ranges of wavelengths of light.

Additionally or alternatively, at least one of the optical filtering properties may be an absorptive blocking of a first range of wavelengths of light and at least another one of the optical filtering properties is an interference-based blocking of a second range of wavelengths of light.

The first range of wavelengths and the second range of wavelengths may overlap to provide for customized ranges of blocked wavelengths.

For precise shaping of blocking flanks, the interference-based blocking of the second range of wavelengths forms a steeper spectral second blocking flank than a spectral first blocking flank of the absorptive blocking of the first range of wavelengths. This allows for blocking a wide range of wavelengths via an absorptive filter and a precise cut-off flank via the interference filter, also called a dichroic filter.

Preferably, the sloped spectral first blocking flank extends over a range of wavelengths blocked by the interference based blocking so that the interference filter can instead provide a steep edge of flank of the blocked range of wavelengths.

According to one embodiment, the hybrid functionality of the optical filter can be achieved by providing at least one film layer of the plurality of film layers as an absorptive filter layer and at least another one film layer of the plurality of film layers as an interference filter layer. Each interference film layer may be a multilayer film, in which each sub-layer of the multilayer structure of the interference filter layer has a thickness and refractive index adapted in a generally known manner to the wavelengths to be reflected and transmitted, respectively.

Where the at least one interference filter layer includes at least two interference filter layers, and the absorptive filter layer is arranged between two of the at least two interference filter layers. This is especially beneficial if the absorption is carried out by a dye contained in the absorptive layer. The interference film layers protect the dye molecules from bleeding and from environmental damage.

Alternatively, at least one film layer of the of film layers may both an absorptive filter and an interference filter, where an interference filter film is also doped with pigments or a dye, at least in some of the sub-layers of the multilayer structure.

Regardless of the individual filter layer or layers, at least one outermost layer of the plurality of film layers may be a clear, transparent protective layer to shield the filter film layer that have a filter function. The term "clear" means that no color-changing dye, pigment, or other dopant is present, and "transparent" means that no additional structure is added to the layer material that would cause a wavelength-dependent blocking of light. The transparent property is herewith defined as allowing a transmission of at least 90% of the light intensity, at least over a targeted range of the light spectrum, which may be, for example, the visible spectrum, a portion of or the entire infrared spectrum, a range within the ultraviolet spectrum, or a range partially extending within the visible spectrum and partially outside of the visible light spectrum.

In an embodiment, in which the plurality of polymer film layers comprises at least two interference filter layers and at least two absorptive filter layers, the interference filter layers and the absorptive filter layers may be arranged in an alternating order.

The hybrid optical filter may be manufactured by laminating the least two ultra-thin polymer film layers together using an index-matched liquid or adhesive layer in between them to reduce total internal reflection at the interface between individual filters. To shape the hybrid optical filter to a desired curvature, the shape of a first one of the at least two polymer film layers can first be adapted to the shape of a curved surface, and subsequently, a second one of the at least two polymer film layers can be laminated onto the first polymer film layer.

Optionally, the second polymer film layer can be shaped into the shape of the first polymer film layer prior to laminating the second polymer film layer to the first polymer film layer. But because the individual polymer layers are much more flexible than the assembled laminated structure, this step may not be omitted so that a generally planar second polymer layer is adapted to the curved surface by lamination.

Similar considerations apply to a plurality of layers with more than two layers. Pre-shaped subsequent layers may be laminated all in one step with pre-shaped layers, while laminating planar layers to the curved surface may require several successive lamination steps.

Further details and benefits of the present invention will become apparent from the following description of preferred embodiments by way of the attached drawings.

The drawings are provided herewith for purely illustrative purposes and are not intended to limit the scope of the present invention.

DETAILED DESCRIPTION OF THE DRAWINGS

The present invention has various aspects to address shortcoming of known optical filters by combining multiple ultra-thin filters or multiple filtering mechanisms (that is, absorption and interference) in a single ultra-thin filter:

Combining Multiple Individually-Made Interference Filter Layers

Figure 1:
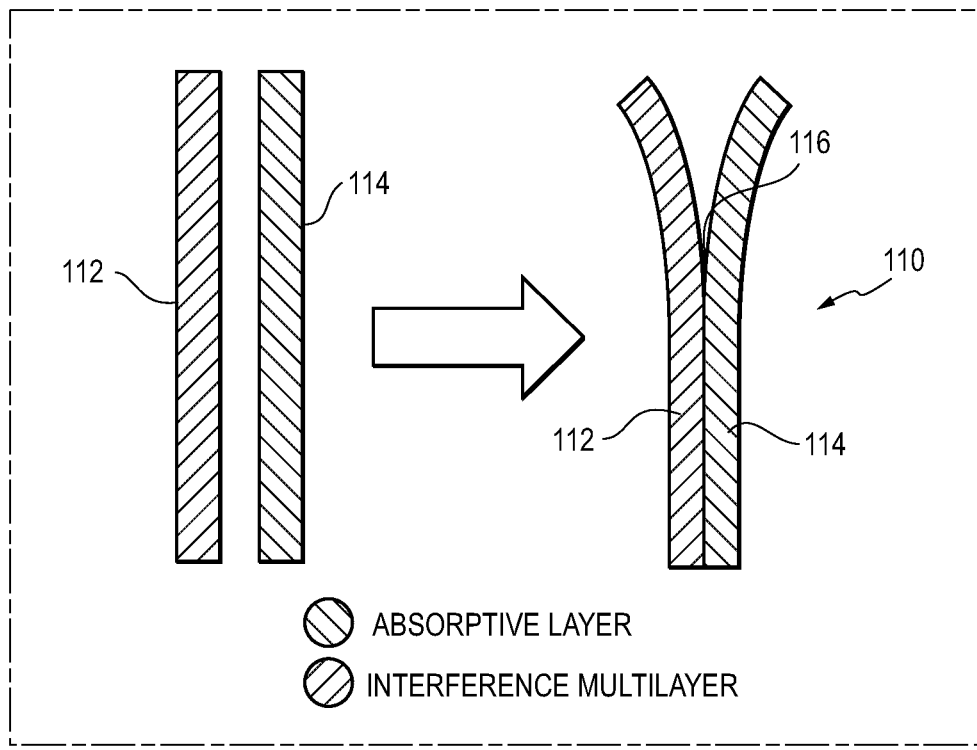
FIG. 1 is a basic schematic illustration of laminating two polymer layers with different optical properties together to form a hybrid optical filter.

In one basic embodiment of a hybrid optical filter 110 shown in FIG. 1, at least two ultra-thin optical filter layers 112 and 114 that are produced individually are laminated together using an index-matched adhesive 116 in the form of a liquid or adhesive layer between them to reduce total internal reflection at the interface between individual filter layers. At least one of the film layers 112 and 114 is a polymer film layer. The hybrid optical filter 110 may also include alternating layers of a low-index polymer and a high-index, low-temperature glass in order to provide more blocking with a lower number of filter layers.

Each of the filter layers 112 and 114 may be a multilayer interference filter film, which itself consists of many very thin sub-layers forming a dichroic filter. This principle is shown in FIG. 1, albeit with one of the filter layers shown as an absorptive filter layer. In FIG. 1, the filter layer 112 is an interference filter film, and the filter layer 114 is shown as an absorptive filter film, consisting of a polymer film that is tinted to allow only a certain wavelength bandwidth to pass through the filter. The two film layers 112 and 114 are laminated with an adhesive 116 that may, as mentioned above, be a liquid or a film or a viscous, curable substance. Without limitation, however, the filter layer 114 may alternatively be an interference filter layer. Alternative methods for bringing the two film layers 112 and 114 into adhesion with each other are within the scope of the present invention as well. Thermally bonding the individual filters to one another is particularly feasible for filter layers that have protective jackets so that they can be mildly warmed up without damaging the internal interference layers and pressed against each other. Another available option is ultra-sonic welding and lamination of at least two filter film layers. This is a method for fusing plastic films by heating the filter film material with acoustic waves.

Each individually made filter layer 112 and 114 (and any further filter layers not shown in FIG. 1) may be purely interference-based with thickness in the range 0.05 mm to 1 mm. This filter assembly can be constructed in flat form by laminating and pressing all individual filter layers 112 and 114 into a combined planar hybrid optical filter 110. The constructed assembled hybrid optical filter 110 may no longer be as flexible as the individual filter layers 112 and 114, or flexible enough for bending to or laminating it to curved surfaces with small curvature radius. But it may still be flexible enough for conforming it to a cylindrical surface with a larger curvature radius.

Figure 5A:
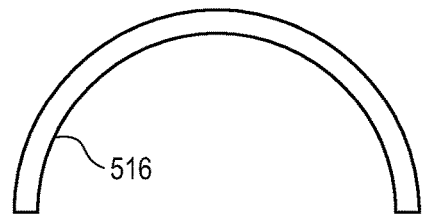
FIG. 5A shows a first example of assembling a curved hybrid optical filter.
Figure 5A:
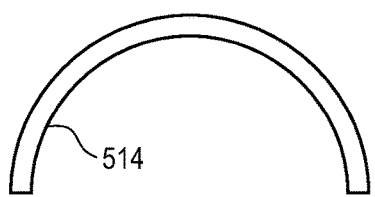
Figure 5A:
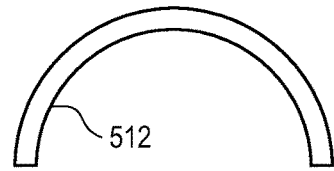
Figure 5A:
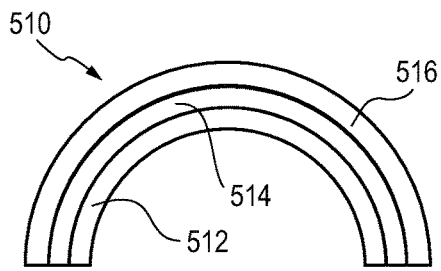
Figure 5B:
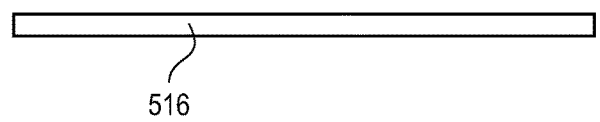
FIG. 5B shows a second example of assembling a curved hybrid optical filter.
Figure 5B:
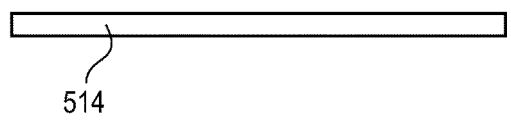
Figure 5B:
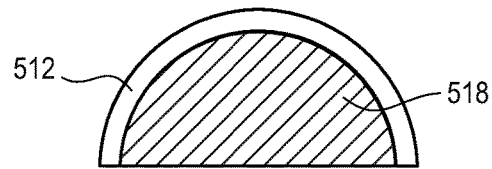
Figure 5B:
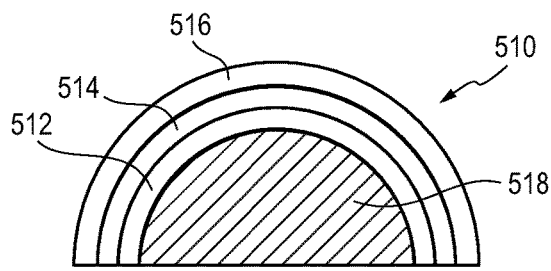

Alternatively, as shown in FIG. 5A, each individual filter layer 512, 514, and 516 can first be individually bent to a desired curvature or laminated to a curved surface and optionally be heated to conveying a durable curved shape. The preshaped filter layers can then be laminated together as described in connection with FIG. 1. Alternatively, as shown in FIG. 5B, individual planar layers may be successively laminated to a curved surface 518 on top of one another. The construction can then continue by laminating more individually made flexible filters to the assembly. Even though the completed stack or assembly of the hybrid optical filter 510 lacks sufficient flexibility for adapting to a different curvature radius, it still conforms to the curved surface because of the flexibility of individual filter layers 512, 514, and 516. In addition, laminating the individual filter layers 512, 514, and 516 one by one builds less stress in the assembled curved hybrid optical filter 510 compared to the case of bending one thicker filter of the same total thickness to the same curvature.

When multiple individual interference filter layers are combined with this approach, their spectral transmission and filtering characteristics will combine, too. In one example, combining two interference filter layers with identical spectral curves can accomplish higher blocking (optical density) in their shared blocking range. In another example, multiple notch filter layers, each blocking a distinct narrow range of the spectrum can be combined to create a multi-notch filter. Alternatively, if the blocking ranges are adjacent or overlapping, the combined filter assembly can form a wider blocking range.

In another example, a long pass filter that blocks light above a wavelength λ1 can be combined with a short pass filter that blocks light below a wavelength λ2 to create a bandpass filter that transmits light in the wavelength range λ1 to λ2 and blocks the light outside of that range.

Combining Multiple Individually-Made Absorptive and Interference Filter Layers

As mentioned above, the filter assembly can be a combination of absorptive filter layers 114 and interference-based reflective filter layers 112 as shown in FIG. 1. The assembled hybrid optical filter 110 may contain both absorptive and reflective elements. For example, a purely absorptive filter film 110 or sheet can be laminated on and combined with a purely reflective interference-based filter film 114 or sheet, and vice versa, as shown in FIG. 1. A plurality of absorptive layers and interference filter layers may be combined into a single optical hybrid filter. This will combine benefits and blocking characteristics of both filter layers 112 and 114 providing higher optical density or wider blocking spectral range or less sensitivity to the angle of incidence. This will, additionally, allow for assembling such a hybrid filter construction into a curved format or laminated on a curved surface as will be explained in connection with FIGS. 5A and 5B below.

The individual absorptive films forming the layers 114 of this construction may be made through thermal drawing of a preform block embedded with a dye, absorptive pigments, or other dopants using a method similar to that of the US publication US 2014/0242329 A1, through thermal extrusion of pigmented material, or through casting of pigmented melts or solutions. The absorptive combined hybrid optical filter layers can be flexible or rigid with thicknesses in the range 0.1 mm to 5 mm.

Due to the low refractive index contrast between different types of plastic, hundreds to thousands of interference filter sub-layers may be required to achieve high optical density of one interference film layer. The great number of filter sub-layers make manufacturing and processing the filters more complex and expensive.

Using pigments or organic dyes or other dopants for absorption to supplement the interference layers will decrease the overall number of layers necessary to achieve the desired optical density without compromising the filtered spectral shape. This approach will reduce time needed to manufacture a filter, overall cost of production, and potentially increase flexibility in the filter.

Combining an absorptive filter layer 114 or sheet with an interference filter layer 112 or sheet extends the blocking spectral range while maintaining sharp transition edges provided by the interference filter layer 112 as shown in FIG. 1. Another example is combining an absorptive filter layer 114 or sheet absorbing wavelengths of light below a wavelength λ1 and an interference filter layer 112 or sheet reflecting light wavelengths above a wavelength λ2 in order to create a bandpass filter that transmits light in the wavelength range λ1 to λ2 and blocks the light outside of that range.

Figure 6:
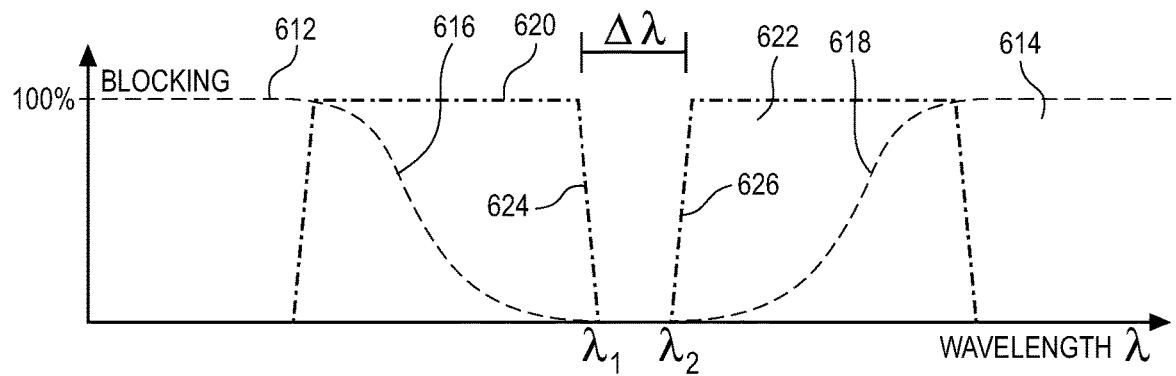
FIG. 6 shows an example of spectral ranges blocked and transmitted by a hybrid optical bandpass filter according to the present invention.

One example of combining the principles of absorption and interference filtering is schematically shown in FIG. 6. Shown is a combination of one or more absorptive filter film(s) or sheet(s) that collectively absorb light outside of a wavelength range λ1 to λ2 using at least two absorbing pigments with absorptive blocking ranges 612 and 614 with gradual (shallow) transition 616 and 618 from high to low transmission. This can be supplemented with one or more thin film interference filter layers 620 and 622 to form a bandpass filter in the wavelength range $\lambda_1$ to $\lambda_2$ with sharper (steeper) transition edges or flanks 624 and 626.

FIG. 6 is a diagram of light blocking over a range of wavelengths. Thus, a curve shown at 100% blocks all light, while at 0%, all light passes through the filter. The absorptive blocking ranges 612 and 614 of the filter properties illustrated in FIG. 6 are both in a long-wavelength range and in a short-wavelength range on both sides of a spectral transmission band Δλ between wavelengths $\lambda_1$ and $\lambda_2$. As typical with absorption spectra, however, the transition edges or flanks 616 and 618 of the absorptive spectrum are rather shallow and do not provide a sharp cut-off wavelength. Thus, at least one interference-based filter layer is added that includes one multilayer structure defining the lower cut-off wavelength $\lambda_1$ of the spectral transmission band Δλ and another multilayer structure defining the upper cut-off wavelength $\lambda_2$ of the spectral transmission band Δλ. While each of the wavelength ranges 620 and 622 blocked by the interference filter element is narrower than the wavelength ranges 612 and 614 blocked by the absorptive filter element or elements, the blocking bandwidth of the interference filter layers is broad enough to cover the shallow flanks 616 and 618 of the absorption filter layers. In analogy hereto, modified blocking spectra can be achieved by only using a subset of the filters included in FIG. 6 or by choosing different filter properties. The combination of absorptive and interference-based blocking allows for very thin filter films to achieve superior optical blocking flanks 624 and 626.

The wavelengths blocked by absorptive layers are independent of an incidence angle of the incoming light, but have shallow flanks. Interference-based multilayer structures have sharper cut-off edges, i.e. steeper flanks, but the blocked wavelengths are sensitive to the incidence angle of the incoming light. Where this effect is undesirable, a curved shape may be provided as described above to obtain the advantages of both principles while minimizing the disadvantages.

Each absorptive filter film or sheet may contain multiple absorptive pigments at various wavelength ranges to absorb over a wider range or over different ranges. Each interference filter layer can similarly contain thin optical sublayers of different thicknesses to reflect light in various wider or different spectral ranges.

Combining Absorptive and Interference Elements in One Filter Film or Sheet

When the total thickness or flexibility of the filter film or sheet is not a limiting factor, multiple absorptive and interference components can be combined in a single filter film or sheet thermally drawn simultaneously. In this case, a preform block in larger dimensions will be assembled with various configurations and structures disclosed below. This preform block is then thermally drawn according to the method disclosed in the publication US 2014/0242329 A1. This can be achieved in various ways.

Figure 2A:
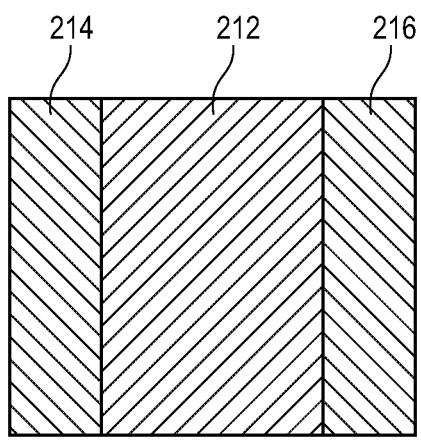
FIG. 2A shows a first example of a hybrid optical filter.

In one embodiment shown in FIG. 2A, a matrix 214 and 216 of material contains absorptive pigments and surrounds a multi-layer section 212 that in the final optical hybrid filter 210 forms an interference based filter layer. A preform block with this configuration is thermally drawn to a hybrid filter film or sheet. Thickness and doping concentration of the absorptive matrix material can be adjusted for any desired level of blocking (optical density). The initial thicknesses of the optical thin film layers in the multi-layer section and the size reduction ratio can be adjusted to achieve interference reflection of a target spectral range with respect to the supplementary absorptive element. Both absorptive and interference sections may be designed and made with multiple pigments or optical layer thicknesses to block a wide spectral range. In the final optical hybrid filter, the layer thicknesses will be proportional to the layer thicknesses in the preform so that FIG. 2A represents the relative layer thicknesses both before and after the drawing process.

Figure 2B:
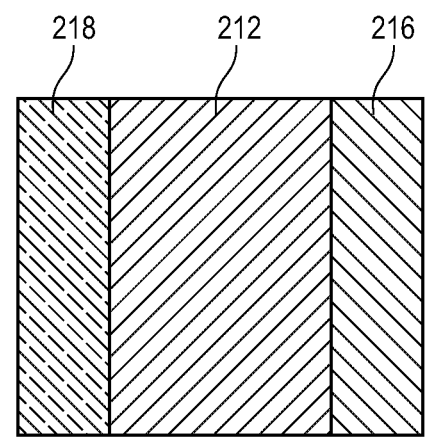
FIG. 2B shows a second example of a hybrid optical filter.

In a similar embodiment shown in FIG. 2B, only parts 216 of the matrix material surrounding the multi-layer section 212 contain absorptive pigments. At least one outside layer 218 forms a protective cover film that will protect the resulting optical hybrid filter from external damage.

Depending on the amount and concentrations of different dyes necessary for the desired spectral shape, either one or both sides of the matrix will be doped with absorptive material.

Figure 3A:
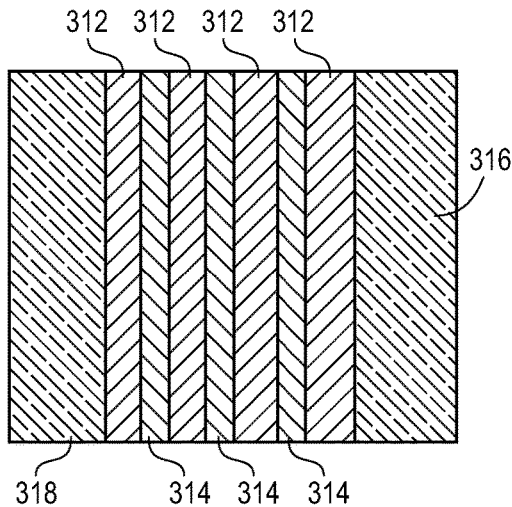
FIG. 3A shows a third example of a hybrid optical filter.

In another embodiment as shown in FIG. 3A, absorptive layers 314 are interlaced between several multilayer inference layers 312. These optically filter layers 312 and 314 are optionally sandwiched between two protective clear layers 316 and 318 forming a jacket. This configuration is used to protect the dyed plastic of the absorptive layers 314 from overheating during the drawing process. It has been shown that certain dyes in higher concentrations change the glass transition temperature of plastic. The clear layers 316 and 318 shield the plastic of the absorptive filter layers 314 from direct heat and thus slow the heat transfer to the plastic of the absorptive filter layers 314.

Figure 3B:
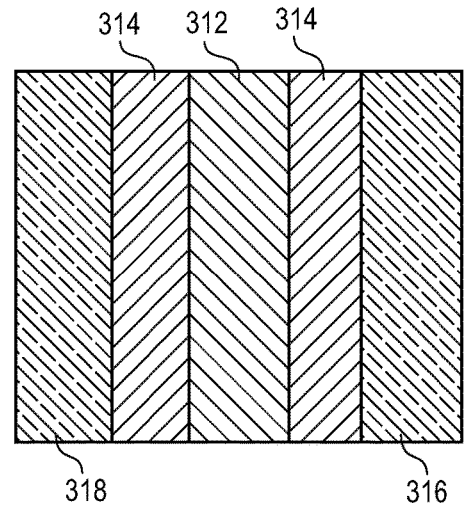
FIG. 3B shows a fourth example of a hybrid optical filter.

FIG. 3B shows a similar arrangement between two clear jacket layers 316, but with fewer layers 312 and 314. In FIG. 3B, all absorptive dyes or pigments are combined in one absorptive layer 314, which is surrounded by multilayer structures on both sides. These multilayer structures form interference filter layers 314 that each may include several multilayer stacks of different sub-layer thickness to block various ranges of wavelengths.

Figure 4:
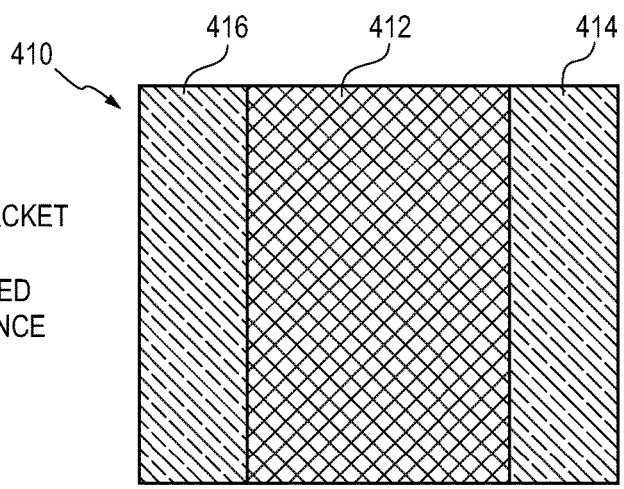
FIG. 4 shows a fifth example of a hybrid optical filter.

In another embodiment shown in FIG. 4, the multi-layer thin optical films that generate interference reflection effect are made of optical materials (for example, polymers) with different refractive indices and pigmented with at least one absorptive material. An advantage of this approach is that both absorptive and reflective elements can be designed and embedded in the same portion 412 of the preform block (and therefore filter film or sheet) resulting in a smaller total thickness, or allowing for higher optical density or wider blocking range in a given filter thickness. In FIG. 4, the central portion 412 represents a multilayer structure with layer thicknesses providing the desired interference properties, in which the individual layers also contain a dye or pigment for absorptive filtering. Optional jacket layers 414 and 416 protect the dyed or pigmented multilayer structure 412. The resulting filter has a multilayer interference filter portion 412 doped with dye or pigment to increase absorption without adding any additional absorption layer. This principle produces a particularly slim profile of an optical hybrid filter film 410, which in turn, creates an highly flexible filter 410.

While the above description constitutes the preferred embodiments of the present invention, it will be appreciated that the invention is susceptible to modification, variation and change without departing from the proper scope and fair meaning of the accompanying claims.

The invention claimed is:

1. A method of making a hybrid optical filter comprising at least two polymer film layers in a single ultra-thin filter, the method comprising the steps of:
   adapting a shape of a first one of the at least two polymer film layers to a shape of a curved surface; and
   laminating a second one of the at least two polymer film layers onto the first polymer film layer using an index-matched liquid or adhesive layer in between the at least two polymer film layers to reduce total internal reflection at an interface between individual filter layers,
   wherein the hybrid optical filter implements at least two different wavelength-dependent optical filtering properties and at least one of the at least two polymer film layers is an optical filter film.

2. The method of claim 1, further comprising the step of adapting a shape of the second polymer film layer to the shape of the first polymer film layer prior to laminating the second polymer film layer to the first polymer film layer.

3. The method of claim 1, wherein the at least two polymer film layers include one outermost film layer that is a clear, transparent protective film layer.

4. The method of claim 1, wherein the first polymer film layer is an interference filter film and the second polymer film layer an absorptive filter film.

5. The method of claim 1, wherein each of the polymer film layers is a multilayer interference film formed from multiple ultra-thin sub-layers.

6. The method of claim 1, wherein each polymer film layer has a thickness in the range of 0.05 mm to 1 mm.

* * * * *